(12) United States Patent
Li et al.

(10) Patent No.: US 8,407,214 B2
(45) Date of Patent: Mar. 26, 2013

(54) CONSTRUCTING A CLASSIFIER FOR CLASSIFYING QUERIES

(75) Inventors: Xiao Li, Bellevue, WA (US); Ye-Yi Wang, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 788 days.

(21) Appl. No.: 12/145,508

(22) Filed: Jun. 25, 2008

(65) Prior Publication Data

US 2009/0327260 A1  Dec. 31, 2009

(51) Int. Cl.
*G06F 17/30* (2006.01)

(52) U.S. Cl. ........ 707/726; 707/728; 707/731; 707/737; 707/749; 707/798

(58) Field of Classification Search .................. 707/708, 707/710, 726, 721, 737, 741, 763, 706, 767, 707/728, 731, 749, 798; 705/5; 715/234
See application file for complete search history.

(56) References Cited

U.S. PATENT DOCUMENTS

| | | | |
|---|---|---|---|
| 6,691,108 B2* | 2/2004 | Li | 707/710 |
| 6,738,678 B1* | 5/2004 | Bharat et al. | 700/48 |
| 6,892,189 B2* | 5/2005 | Quass et al. | 706/12 |
| 7,266,559 B2 | 9/2007 | Cook et al. | |
| 8,176,069 B2* | 5/2012 | Timm et al. | 707/767 |
| 2003/0172062 A1* | 9/2003 | Brocklebank et al. | 707/4 |
| 2003/0172352 A1* | 9/2003 | Kashima et al. | 715/513 |
| 2006/0288038 A1 | 12/2006 | Zheng et al. | |
| 2007/0136457 A1 | 6/2007 | Dai et al. | |
| 2007/0203908 A1* | 8/2007 | Wang et al. | 707/7 |
| 2007/0214115 A1* | 9/2007 | Liu et al. | 707/3 |
| 2007/0239642 A1 | 10/2007 | Sindhwani et al. | |
| 2008/0059508 A1 | 3/2008 | Lu et al. | |
| 2008/0071708 A1* | 3/2008 | Dara et al. | 706/20 |
| 2008/0082352 A1* | 4/2008 | Schmidtler et al. | 705/1 |
| 2008/0082518 A1 | 4/2008 | Loftesness | |
| 2008/0114607 A1* | 5/2008 | Amer-Yahia et al. | 705/1 |
| 2008/0114759 A1* | 5/2008 | Yahia et al. | 707/6 |
| 2008/0183685 A1* | 7/2008 | He et al. | 707/4 |
| 2008/0232690 A1* | 9/2008 | Saund et al. | 382/187 |
| 2008/0256061 A1* | 10/2008 | Chang et al. | 707/5 |
| 2008/0260247 A1* | 10/2008 | Grady et al. | 382/173 |
| 2009/0006357 A1* | 1/2009 | Popescul et al. | 707/5 |
| 2009/0132561 A1* | 5/2009 | Cormode et al. | 707/100 |

(Continued)

FOREIGN PATENT DOCUMENTS

EP   1903479 A1   3/2008
WO   2008022150 A2   2/2008

OTHER PUBLICATIONS

Cui et al., Query Expansion by Mining User Logs, Aug. 2003, pp. 1-10.*

(Continued)

*Primary Examiner* — Sherief Badawi (74) *Attorney, Agent, or Firm* — Lyon & Harr, LLP; Katrina A. Lyon (57) ABSTRACT

To construct a classifier, a data structure correlating queries to items identified by the queries is received, where the data structure contains initial labeled queries that have been labeled with respect to predetermined classes, and unlabeled queries that have not been labeled with respect to the predetermined classes. The data structure is used to label at least some of the unlabeled queries with respect to the predetermined classes. Queries in the data structure that have been labeled with respect to the predetermined classes are used as training data to train the classifier.

18 Claims, 3 Drawing Sheets

U.S. PATENT DOCUMENTS

| | | | |
|---|---|---|---|
| 2009/0164895 A1* | 6/2009 | Baeza-Yates et al. | 715/700 |
| 2009/0265317 A1* | 10/2009 | Buehrer et al. | 707/3 |
| 2009/0327260 A1* | 12/2009 | Li et al. | 707/5 |
| 2011/0314011 A1* | 12/2011 | Buehrer et al. | 707/728 |

OTHER PUBLICATIONS

Amini, et al. "The Use of Unlabeled Data to Improve Supervised Learning for Text Summarization", Proceedings of the 25th annual international ACM SIGIR conference on Research and development in information retrieval, Aug. 11-15, 2002, pp. 105-112, ACM Press New York, NY, USA.

Beitzel, et al. "Automatic Classification of Web Queries Using Very Large Unlabeled Query Logs", ACM Transactions on Information Systems, vol. 25, No. 2, Article 9, Publication date: Apr. 2007, pp. 1-29.

Beitzel, et al. "Automatic Web Query Classification Using Labeled and Unlabeled Training Data", Proceedings of the 28th annual international ACM SIGIR conference on Research and development in information retrieval, Date: Aug. 15-19, 2007, pp. 581-582, ACM Press New York, NY, USA.

Yu, et al. "PEBL: Positive Example Based Learning for Web Page Classification Using SVM", Proceedings of the eighth ACM SIGKDD international conference on Knowledge discovery and data mining, Date: 2002, pp. 239-248, ACM Press New York, NY, USA.

Agichtein, et al. "Improving Web Search Ranking by Incorporating User Behavior Information", Proceedings of the 29th annual international ACM SIGIR conference on Research and development in information retrieval, Date: Aug. 6-11, 2006, pp. 19-26, ACM Press New York, NY, USA.

Baker, et al. "Distributional Clustering of Words for Text Classification", Proceedings of the 21st annual international ACM SIGIR conference on Research and development in information retrieval, Date: 1998, pp. 96-103, ACM Press New York, NY, USA.

Beeferman, et al. "Agglomerative Clustering of a Search Engine Query Log", Proceedings of the sixth ACM SIGKDD international conference on Knowledge discovery and data mining, Date: 2000, pp. 407-416, ACM Press New York, NY, USA.

Beitzel, et al. "Varying Approaches to Topical Web Query Classification", Proceedings of the 30th annual international ACM SIGIR conference on Research and development in information retrieval, Date: Jul. 23-27, 2007, pp. 783-784, ACM Press New York, NY, USA.

Beitzel, et al "Improving Automatic Query Classification via Semi-Supervised Learning", Proceedings of the Fifth IEEE International Conference on Data Mining, Date: 2005, pp. 42-49, IEEE Computer Society Washington, DC, USA.

Broder, et al. "Robust Classification of Rare Queries Using Web Knowledge", Proceedings of the 30th annual international ACM SIGIR conference on Research and development in information retrieval, Date: Jul. 23-27, 2007, pp. 231-238, ACM Press New York, NY, USA.

Craswell, et al. "Random Walk on the Click Graph", Proceedings of the 30th annual international ACM SIGIR conference on Research and development in information retrieval, Date: Jul. 23-27, 2007, pp. 239-246, ACM Press New York, NY, USA.

Cucerzan, et al. "Query Suggestion Based on User Landing Pages", Proceedings of the 30th annual international ACM SIGIR conference on Research and development in information retrieval, Date: Jul. 23-27, 2007, pp. 875-876, ACM Press New York, NY, USA.

Lee, et al. "Automatic Identification of User Goals in Web Search", Proceedings of the 14th international conference on World Wide Web, Date: May 10-14, 2005, pp. 391-400, ACM Press New York, NY, USA.

Nigam, et al. "Using Maximum Entropy for Text Classification", in IJCAI-99 Workshop on Machine Learning for Information Filtering, Date: 1999, 7 Pages.

Pereira, et al. "Distributional Clustering of English Words", Proceedings of the 31st annual meeting on Association for Computational Linguistics, Date: 1993, pp. 183-190, Association for Computational Linguistics Morristown, NJ, USA.

Shen, et al. "Building Bridges for Web Query Classification", Proceedings of the 29th annual international ACM SIGIR conference on Research and development in information retrieval, Date: Aug. 6-11, 2006, pp. 131-138, ACM Press New York, NY, USA.

Szummer, et al. "Partially Labeled Classification with Markov Random Walks", Date: 2001, 8 Pages.

Yarowsky David, "Unsupervised Word Sense Disambiguation Rivaling Supervised Methods", Proceedings of the 33rd annual meeting on Association for Computational Linguistics, Date: 1995, pp. 189-196, Association for Computational Linguistics Morristown, NJ, USA.

Zhou, et al. "Learning with Local and Global Consistency", Advances in Neural Information Processing Systems 16. MIT Press, Cambridge, MA, 2004, 8 Pages.

Zhu, et al. "Learning from Labeled and Unlabeled Data with Label Propagation", CMU CALD Tech Report CMU-CALD-02-107, Date: 2002, 8 Pages.

Nguyen, et al., "Functional Faceted Web Query Analysis", in WWW2007: 16th International World Wide Web Conference, May 8-12, 2007, 8 Pages.

\* cited by examiner

FIG. 4

CONSTRUCTING A CLASSIFIER FOR CLASSIFYING QUERIES

BACKGROUND

Web searching has become a common technique for finding information. Popular search engines allow users to perform broad based web searches according to search terms entered by the users in user interfaces provided by the search engines (e.g. search engine web pages displayed at client devices). A broad based search can return results that may include information from a wide variety of domains (where a domain refers to a particular category of information).

In some cases, users may wish to search for information that is specific to a particular domain. For example, a user may seek to perform a job search or to perform a product search. Such searches (referred to as "query intent searches") are examples of searches where a user has a specific query intent for information from a specific domain in mind when performing the search (e.g. search for a particular type of job, search for a particular product, and so forth). Query intent searching can be provided by a vertical search service, which can be a service offered by a general-purpose search engine, or alternatively, by a vertical search engine. A vertical search service provides search results from a particular domain, and typically does not return search results from domains unrelated to the particular domain.

A query intent classifier can be used to determine whether or not a query received by a search engine should trigger a vertical search service. For example, a job intent classifier is able to determine whether or not a received query is related to a job search. If the received query is classified as relating to a job search, then the corresponding vertical search service can be invoked to identify search results in the job search domain (which can include websites relating to job searching, for example). In one specific example, a job intent classifier may classify a query containing the search phase "trucking jobs" as being positive as a job intent search, which would therefore trigger a vertical search for information relating to jobs in the trucking industry. On the other hand, the job intent classifier will classify a query containing the search phrase "bob jobs" (which is a name of a person) as being negative for a job intent search, and therefore, would not trigger a vertical search service. Because "bob jobs" is the name of a person, the presence of "jobs" in the search phrase should not trigger a job-related query intent search.

A challenge faced by developers of query intent classifiers is that typical training techniques (for training the query intent classifiers) have to be provided with an adequate amount of labeled training data (training data that has been labeled as either positive or negative for a query intent) for proper training of the query intent classifiers. Building a classifier with insufficient labeled training data can lead to an inaccurate classifier.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, a classifier is constructed by receiving a data structure that correlates queries to items identified by queries, where the data structure contains initial labeled queries that have been labeled with respect to predetermined classes, and unlabeled queries that have not been labeled with respect to the predetermined classes. The data structure is then used to label at least some of the unlabeled queries with respect to the predetermined classes. The queries in the data structure that have been labeled with respect to the predetermined classes are then used as training data to train the classifier.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

In accordance with some embodiments, a technique or mechanism of constructing a query intent classifier includes receiving a data structure that correlates queries to items that are identified by the queries, and producing training data based on the data structure for training the query intent classifier (also referred to as "learning the query intent classifier"). A query intent classifier is a classifier used to assign queries to classes that represent whether or not corresponding queries are associated with particular intents of users to search for information from particular domains (e.g., intent to perform a search for a job, intent to perform a search for a particular product, intent to search for music, intent to search for movies, etc.). Such classes are referred to as "query intent classes." A "domain" (or alternatively, a "query intent domain") refers to a particular category of information that a user wishes to perform search in.

The term "query" refers to any type of request containing one or more search terms that can be submitted to a search engine (or multiple search engines) for identifying search results based on the search term(s) contained in the query. The "items" that are identified by the queries in the data structure are representations of search results produced in response to the queries. For example, the items can be uniform resource locators (URLs) or other information that identify addresses or other identifiers of locations (e.g. websites) that contain the search results (e.g., web pages).

In one embodiment, the data structure that correlates queries to items identified by the queries can be a click graph that correlates queries to URLs based on click-through data. "Click-through data" (or more simply, "click data") refers to data representing selections made by one or more users in search results identified by one or more queries. A click graph contains links (edges) from nodes representing queries to nodes representing URLs, where each link between a particular query and a particular URL represents at least one occurrence of a user making a selection (a click in a web browser, for example) to navigate to the particular URL from search results identified by the particular query. The click graph may also include some queries and URLs that are not linked, which means that no correlation between such queries and URLs has been identified.

In the ensuing discussion, reference is made to click graphs that contain representations of queries and URLs, with at least some of the queries and URLs correlated (connected by links). However, it is noted that the same or similar techniques can be applied with other types of data structures other than click graphs.

The click graph correlating queries to URLs initially includes a relatively small set of queries that have been labeled (such as by one or more humans) with respect to query intent classes. In one implementation, the query intent classes can be binary classes that include a positive class and a negative class with respect to a particular query intent. A query labeled with a "positive class" indicates that the query is positive with respect to the particular query intent, whereas a query labeled with the "negative class" means that the query is negative with respect to the query intent.

In addition to queries that are labeled with respect to query intent classes, the click graph initially can also contain a relatively large number of queries that are unlabeled with respect to query intent classes. The unlabeled queries are those queries that have not been assigned to any of the query intent classes. The small set of labeled queries initially in the click graph are referred to as "seed queries." The seed queries are provided to enable iterative propagation of query intent class labels to the unlabeled queries in the click graph.

Figure 1A:
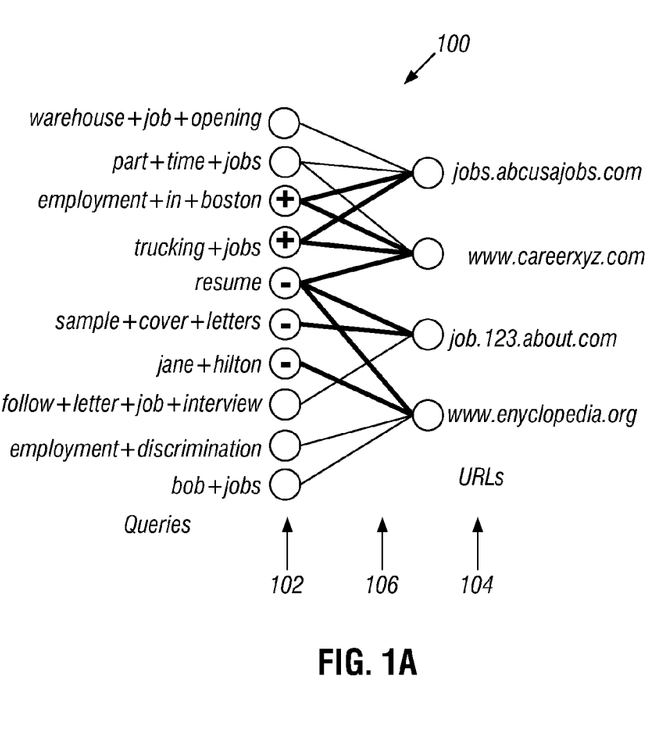
FIGS. 1A-1B illustrate an exemplary click graph that can be used with some embodiments of the invention.
Figure 1B:
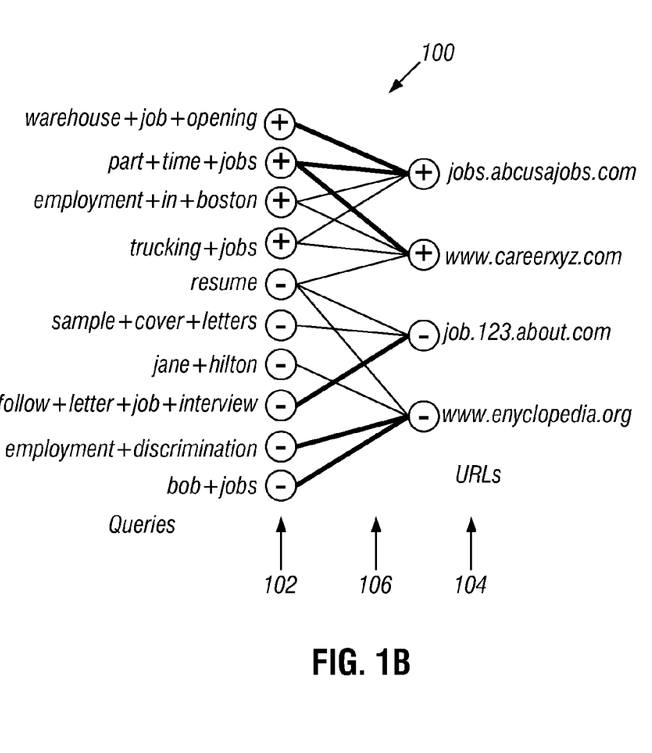

An example of a click graph 100 is depicted in FIGS. 1A-1B. The click graph 100 of FIG. 1A has a number of query nodes 102 on the left, and a number of URL nodes 104 on the right. In FIG. 1A, some of the query nodes are labeled with a "+" symbol or with a "−" symbol, while other nodes are unlabeled. The query nodes labeled with the "+" symbol have been assigned a positive query intent class (in other words, the queries associated with such nodes are positive examples of the query intent), whereas the nodes labeled with "−" have been assigned a negative query intent class (in other words, the queries associated with such "−" nodes are examples of queries that do not correspond to the query intent).

Links (or edges) 106 connect certain pairs of query nodes 102 and URL nodes 104. Note that not all of the query nodes 102 and 104 are linked. For example, the query node 102 corresponding to the search phrase "warehouse+job+opening" is linked to just the URL node "jobs.abcusajobs.com," and to no other URL nodes in the click graph 100. What this means is that in response to the search results to the search query containing search phrase "warehouse+job+opening," the user made a selection in the search results to navigate to the URL "jobs.abcusajobs.com," and did not make selections to navigate to the other URLs depicted in FIG. 1A (or alternatively, the other URLs did not appear as search results in response to the query containing search phrase "warehouse+job+opening").

Each of the links 106 in FIG. 1A is associated with a weight, which in one example can be the count (or some other value based on the count) of clicks made between the particular pair of a query node and a URL node. In the click graph 100, queries with similar click patterns are likely to have the same query intent class label.

In accordance with some embodiments, the unlabeled queries in the click graph 100 are labeled with respect to the query intent classes based on correlations between the URLs and labeled queries in the click graph 100. Query intent class memberships of unlabeled query nodes in the click graph 100 are inferred from the class memberships of labeled query nodes according to the proximities of the labeled query nodes to the unlabeled query nodes in the click graph 100. Proximity of a labeled query node to an unlabeled query node is based on similarity of click patterns to corresponding URL nodes.

Using techniques according to some embodiments, a relatively large portion (or even all) of the unlabeled queries in the click graph can be labeled with the query intent classes. The labeled queries (including the seed queries as well as queries later labeled based on the seed queries) in the click graph are then used as training data to train the query intent classifier.

FIG. 1B shows an example of how the unlabeled query nodes 102 of FIG. 1A have been labeled with a positive query intent class ("+" symbol) or negative query intent class ("−" symbol). Also, the URL nodes 104 of FIG. 1B have also been assigned either a "+" symbol or a "−" symbol to indicate whether the URL corresponds to the positive query intent class or negative query intent class, respectively. In the example of FIG. 1B, "jobs.abcusajobs.com" and "www.careerxyz.com" have been labeled with the positive query intent class, whereas URL nodes "job123.about.com" and "www.encyclopedia.org" have been labeled with a negative query intent class.

As can be seen from the example of FIGS. 1A-1B, based on correlations between the seed queries and the URL nodes connected to such seed queries, the remaining nodes of the click graph 100 can be assigned labels to indicate whether or not the respective nodes are positive or negative with respect to a job intent.

In the example of FIGS. 1A-1B, the click graph 100 is a bipartite graph that contains a first set of nodes to represent queries and a second set of nodes to represent URLs, with edges (links) connecting correlated query nodes and URL nodes. In other embodiments, other types of data structures can be used for correlating queries with URLs based on click data.

The click graph 100 shows URL nodes that represent corresponding individual URLs. Note that in an alternative embodiment, instead of each URL node representing an individual URL, a node 104 can represent a cluster of URLs that have been clustered together based on some similarity metric.

Using some embodiments of the invention, the amount of training data that is available for training a query intent classifier can be expanded in an automated fashion, for more effective training of a query intent classifier, and to improve the performance of such query intent classifier. In some cases, with the large amounts of training data that can be obtained in accordance with some embodiments, query intent classifiers that use just query words or phrases as features can be relatively accurate. Consequently, selection of other features (other than the search terms or phrases in the queries) does not have to be performed for improving performance of query intent classifiers.

More formally, according to an embodiment, from a collection of click data (selections or clicks made by users in search results for queries to navigate to selected URLs), a bipartite graph (one example type of a click graph) $G=(X \cup Z, E)$ is constructed, where $X=\{x_i\}_{i=1}^{m}$ represents a set of m queries (nodes 102 in FIGS. 1A-1B) and $Z=\{z_k\}_{k=1}^{n}$ represents a set of n URLs (or clustered URLs) (nodes 104 in FIGS. 1A-1B). Each edge (corresponding to a link 106 in FIGS. 1A-1B) in E connects a vertex (node 102) in X with a vertex (node 104) in Z, and there is no edge between two vertices in the same set. Let W represent an m×n weight matrix, in which element $w_{i,k}$ of W equals the click count (or some value based on the click count) associating vertices $x_i$ and $z_k$. Furthermore, a relatively small set of seed queries, denoted as $X_L$, are manually labeled as positive or negative with respect to a specific query intent. Given the click graph G and the labeled set $X_L$, a technique according to some embodiments automatically assigns labels to unlabeled queries in the set $X \setminus X_L$.

Also, let F denote an m×2 matrix, in which element $f_{i,y}$ is a non-negative, real number indicating the "likelihood" (expressed as a probability or some other value) that query $x_i$ belongs to class y (a positive or negative query intent class). The two columns of the F matrix correspond to two (binary) possible query intent classes: (1) positive query intent class and (2) negative query intent class. In alternative implementations, instead of binary query intent classes, more than two query intent classes can be considered. In the latter case, the matrix F will have more than two columns. Although F is assumed to be a matrix in this discussion, note that in other implementations, F can be any other type of collection of elements that can be assigned values representing likelihoods that queries belong to query intent classes.

Note that initially, each element $f_{i,y}$ of F has either a "0" value (probability is 0) or a "1" value (the probability is 1) of a query $x_i$ belonging to class y. The seed queries (queries that have been labeled by one or more humans with respect to the query intent classes) are either assigned a positive query intent class or negative intent class, and thus the value of element $f_{i,y}$ can be assigned to a "1" or "0" correspondingly. Moreover, any unlabeled query is assigned a probability of "0" in both columns of the m×2 F matrix.

$F^0$ is used to denote an instantiation of F that is consistent with the manual labels of the seed queries in $X_L$: for $x_i \in X_L$ that are labeled as positive, $f_{i,+1}^0 = 1 - f_{i,-1}^0 = 1$; for those labeled as negative, $f_{i,+1}^0 = 1 - f_{i,-1}^0 = 0$; and for all unlabeled queries $x_i \in X \setminus X_L$, $f_{i,+1}^0 = f_{i,-1}^0 = 0$. The technique according to some embodiments is to estimate F given G and $F^0$.

In accordance with one embodiment, a first algorithm (referred to as a "graph-based learning algorithm") is used for assigning values to elements of F using an iterative process that continues until F converges to a final solution (in other words, F satisfies a convergence criterion). The graph-based learning algorithm is performed in the context of a procedure depicted in FIG. 2, in one embodiment. The procedure according to FIG. 2 collects (at 202) click data and generates a click graph (G) from the click data. The click data can be collected by monitoring user queries submitted at one or more search engines and collecting clicks made by the users in search results identified by the queries.

Figure 2:
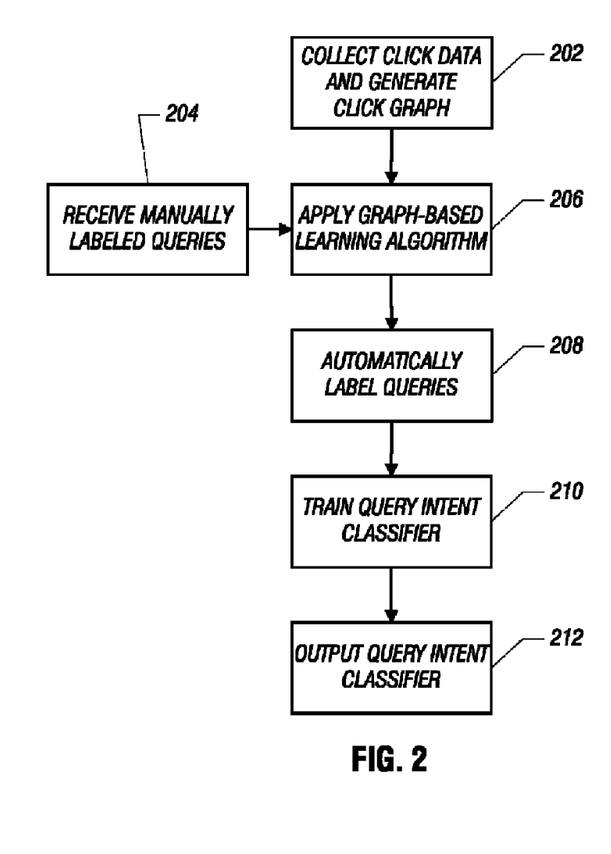
FIG. 2 is a flow diagram of a process of constructing a query intent classifier, in accordance with an embodiment.

The FIG. 2 procedure also receives (at 204) manually labeled queries, which are the seed queries discussed above. The click graph and the manually labeled queries are provided as inputs to the graph-based learning algorithm, which is applied (at 206) to find F.

Based on F, the unlabeled queries in the click graph are automatically labeled (at 208). Recall that F contains elements $f_{i,y}$ each indicating the probability that each given query belongs to the positive query intent class or negative query intent class. If the probability exceeds some predefined threshold for the corresponding query intent class, then the corresponding unlabeled query can be assigned to that class and be labeled accordingly.

Once the queries of the click graph have been labeled, such labeled queries are used as training data for training (at 210) a query intent classifier. In one exemplary embodiment, the query intent classifier is a maximum entropy classifier. Alternatively, other types of classifiers can be used as a query intent classifier.

Once the query intent classifier has been trained, the query intent classifier is output (at 212) for use in classifying queries. For example, the query intent classifier can be used in connection with a search engine. The query intent classifier is able to classify a query received at the search engine as being positive or negative with respect to a query intent. If positive, then the search engine can invoke a vertical search service. On the other hand, if the query intent classifier categorizes a received query as being negative for a query intent, then the search engine can perform a general purpose search.

Details associated with one exemplary embodiment of the graph-based learning algorithm applied at 206 in FIG. 2 are provided below. In other embodiments, other implementations of the graph-based learning algorithm can be used.

In performing the graph-based learning algorithm, a normalized click count matrix $B = D^{-1/2}W$ is defined. Here D is a diagonal matrix, in which element $d_{i,i}$ equals the sum of all elements in the $i^{th}$ row (or column) of $WW^T$. The element $d_{i,i}$ can be understood as the "volume" of all length-of-two paths that start at $x_i$. A length-of-two path starts at query node $x_i$, proceeds to a URL node, and then returns either to query node $x_i$ or to another query node. The "volume" of all length-of-two paths that starts at $x_i$ can be represented as the sum of weights of all length-of-two paths that start at $x_i$. The weight of a length-of-two path is the product of the weights of the two edges.

The diagonal matrix D (and more specifically the square root of D) normalizes the weight matrix W.

Given the above definitions, the graph-based learning algorithm is as follows:

Input: matrix $F^0$ and $B = D^{-1/2}W$
Output: F*

1. Initialize F by $F^0$;
2. Compute $H^i = B^T F^{i-1}$;
3. Compute $F^i = \alpha B H^i + (1-\alpha) F^0$, where $\alpha \in [0,1)$, a predefined constant value;
4. Iterate 2 and 3 until the sequence $F^i$ converges to F* (where F* represents an optimal solution, discussed further below).

The algorithm above iteratively proceeds through calculating different $F^i$ matrices (for i=1, 2, . . . ) until a convergence criterion is satisfied.

In step 1, the matrix F is initialized with $F^0$, which as explained above contains elements assigned to "0" or "1" based on labels assigned to seed queries, and contains elements assigned to "0" for unlabeled queries.

In step 2, the transpose of the normalized click count matrix ($B^T$) is multiplied by the previous $F^{i-1}$ matrix to produce an $H^i$ matrix, where the $H^i$ matrix is used in step 3 to calculate the present $F^i$ matrix. Each element of the $H^i$ matrix has a value indicating the likelihood that a corresponding URL has a particular query intent class membership. Effectively, calculating the $H^i$ matrix causes class memberships of the query nodes to be propagated to the URL nodes in the click graph.

In step 3, the value of $\alpha$ is selected empirically, with $\alpha$ determining the tradeoff between selecting values of the $F^i$ matrix to be consistent with the internal structure of the click graph (patterns of links from queries to URLs) and selecting values of the $F^i$ matrix to be consistent with manual labels assigned in the seed queries. In the equation $F^i = \alpha B H^i + (1-\alpha)F^0$ calculated in step 3, $\alpha B H^i$ has a value that is dependent upon the patterns of clicks between query nodes and URL nodes in the click graph, whereas $(1-\alpha)F^0$ has a value that is dependent upon the initial values of F assigned based on the seed queries.

Step 4 causes steps 2 and 3 to be repeated if the convergence criterion is not met ($F^i$ has not converged to F*).

It is noted that steps 2 and 3 above can be merged into a single step, as follows: $F^i = \alpha A F^{i-1} + (1-\alpha)F^0$ where $A = BB^T$, in an alternative implementation.

F* is an optimal solution of minimizing the following objective function:

$$Q(F) = \alpha Q_1(F) + (1-\alpha)Q_2(F) \text{ where} \quad \text{(Eq. 1)}$$

$$Q_1(F) = \frac{1}{2}\sum_{y=\pm 1}\sum_{i,j=1}^{m}\left(\sum_{k=1}^{n}w_{i,k}w_{k,j}\right)\left\|\frac{f_{i,y}}{\sqrt{d_{i,i}}} - \frac{f_{j,y}}{\sqrt{d_{j,j}}}\right\|^2$$

$$Q_2(F) = \frac{1}{2}\sum_{y=\pm 1}\sum_{i=1}^{m}\|f_{i,y} - f_{i,y}^0\|^2$$

The $Q_1(F)$ term in the objective function of Eq. 1 specifies that if two queries are close to each other in the click graph (in terms of closeness of click patterns from the corresponding query nodes to URL nodes), then the two queries should be assigned the same query intent class. The $Q_2(F)$ term, on the other hand, regularizes the estimate of F towards $F^0$ (the values based on the seed queries). In this regard, Q(F) is a tradeoff between the consistency with the intrinsic structure of the click graph and the consistency with manual labels. In other words, the values of F are computed based on an objective function (Eq. 1) that balances computing the values of F based on patterns of correlations between the queries and URLs in the click graph and computing the values of F based on the initial labeled seed queries.

In step 4 of the graph-based learning algorithm above, $F^i$ has converged to F* if the value of Eq. 1 above does not change.

Once F* is obtained, its elements can be normalized to $p(y|x_i)$ values. A posterior probability $p(y|x_i)$ can be computed by normalizing $f_{i,y}/(f_{i,+1}+f_{i,-1})$. In training the query intent classifier, these posterior probabilities can be used directly. Alternatively, the posterior probabilities can be clamped to either 0 or 1 values (e.g., a posterior probability less than some threshold is clamped to 0, whereas a posterior probability greater than the threshold is clamped to 1). An alternative convergence criterion in step 4 discussed above is that the clamped F values do not change.

An issue associated with click graphs is that they can be sparse; in other words, there may be missing edges (links) between queries and URLs that are relevant. In addition, user clicks are often noisy (such as when a user inadvertently clicks on the hyperlink corresponding to a URL that was not intended) which can result in edges between queries and URLs that are un-related. Missing edges in a click graph can prevent correct label information from being propagated, while spurious edges between queries and URLs in a click graph can result in classification errors.

To compensate for sparsity and noise of a click graph, techniques according to some embodiments can regularize the learning of the classifier with a click graph using content-based classification. In other words, the graph-based learning (in which labels are assigned to unlabeled queries in the click graph) and classifier learning (training of the classifier based on the automatically labeled queries and seed queries) are performed jointly. This is contrasted to the procedure of FIG. 2, in which the graph-based learning (tasks 206 and 208) is performed first, followed sequentially by the classifier learning (task 210).

Combining graph-based learning with content-based learning allows a trained classifier to provide an output that is then fed back to the graph-based learning algorithm to modify the output of the graph-based learning algorithm. Such feedback from the trained classifier to the graph-based learning algorithm addresses the issues of sparsity and noise. Sparsity is addressed since labeling performed by the classifier is able to cause additional links to be added to the click graph, whereas noise is addressed since re-labeling of classes made by the classifier can cause un-related links to be removed.

Figure 3:
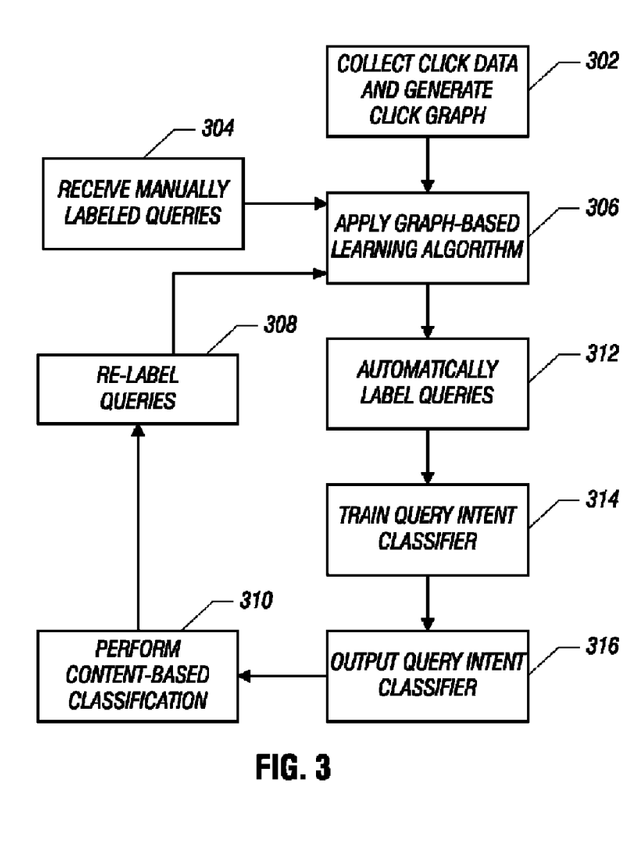
FIG. 3 is a flow diagram of a process of constructing a query intent classifier, in accordance with another embodiment.

A procedure in which graph-based learning is performed jointly with classifier learning is depicted in FIG. 3. As with the FIG. 2 procedure, the procedure of FIG. 3 also involves collecting click data and generating a click graph based on the click data (302), and receiving manually labeled queries (304), which are both provided as inputs to the graph-based learning algorithm applied at 306 for finding matrix F in an iterative fashion (as described above). However, in FIG. 3, feedback is also provided from the trained classifier through tasks 308 and 310.

As depicted in FIG. 3, after applying (306) the graph-based learning algorithm, the unlabeled queries in the click graph are automatically labeled (at 312) using the graph-based learning described in connection with FIG. 2. The automatically labeled queries are then used to perform training of the query intent classifier (at 314), and the trained classifier is output (at 316). The output classifier 316 is then used to perform content-based classification (310) in which queries of the click graph are re-labeled (at 308) by the classifier. The re-labeled queries are then fed back as seed queries to the graph-based learning algorithm applied at 306.

The feedback iteration (feeding back classifier output to the graph-based learning algorithm) can be performed a number of times (e.g., two or greater).

More formally, $F^c(\lambda)$ is used to denote an m×2 matrix, representing the output of a maximum entropy classifier (assuming that the query intent classifier is implemented with a maximum entropy classifier), where $\lambda$ represents the parameters of the classifier. Each element $f_{i,y}^c = p_\lambda(y|x_i)$ in $F^c(\lambda)$ is a classification function defined in Eq. 2:

$$p_\lambda(y|x) = \frac{\exp\sum_j \lambda_j \phi_j(x,y)}{\sum_y \exp\sum_j \lambda_j \phi_j(x,y)}, \quad \text{(Eq. 2)}$$

where x denotes an input, y denotes classes, and $\phi_j(x, y)$, j=1, 2, ... represent a set of lexicon features extracted from queries. The lexicon features can be n-grams, where an n-gram refers to consecutive n word tokens that appear together. For example, the query "trucking jobs" has 1) unigrams: "trucking" and "jobs"; and 2) bigrams: "<s>+trucking", and "trucking+jobs", and "jobs+</s>", where <s> represents the beginning of a sentence and </s> represents the end of a sentence. The classifier is parameterized by $\lambda$ (represented by $\lambda$).

Then $F^c$ can be treated as a prior of F (in other words, the re-labeling of the queries made by the classifier is provided as an input to the graph-based learning algorithm for calculating the next F), and the objective function of Eq. 1 can be modified accordingly:

$$Q(F,\lambda) = \alpha Q_1(F) + (1-\alpha)Q_2(F,\lambda) \quad \text{(Eq. 3)}$$

where $Q_1(F)$ is the same as that in Eq. 1, and $Q_2(F,\lambda)$ has the following form:

$$Q_2(F, \lambda) = \frac{1}{2} \sum_{y=\pm 1}^{m} \sum_{i=1} \|f_{i,y} - f_{i,y}^c(\lambda)\|^2 \quad \text{(Eq. 4)}$$

The new objective $Q(F,\lambda)$ asks F to be consistent with the output of the maximum entropy classifier, while staying consistent with the intrinsic structure of the click graph.

The FIG. 3 procedure basically iteratively optimizes F and $\lambda$ in the following fashion.

Input: matrix $F^0$; and matrix $B = D^{-1/2}W$
Output: $F^*$ and $\lambda^*$ (where $F^*$ is the optimal F, and $\lambda^*$ represents the trained maximum entropy classifier)
1. Initialize $F^* = F^0$, and initialize $\lambda$ at random;
2. Given $F^*$, find $$\lambda^* = \operatorname*{argmin}_{\lambda} Q(F^*, \lambda)$$

using stochastic gradient descent (or other maximum entropy model training algorithm such as generalized iterative scaling);
3. Given $\lambda^*$, find $$F^* = \operatorname*{argmin}_{F} Q(F, \lambda^*)$$

using the graph-based learning algorithm, where the inputs are $F^c(\lambda^*)$ and B;
4. Iterate steps 2 and 3 until the value $Q(F^*,\lambda^*)$ converges. In practice, only a few iterations have to be performed, and the output $\lambda^*$ gives the final maximum entropy classifier.

In step 2 above, $$\operatorname*{argmin}_{\lambda} Q(F^*, \lambda)$$

means that a value of $\lambda$ is found that minimizes $Q(F^*,\lambda)$ according to Eq. 3, using a general optimization algorithm such as the stochastic gradient descent algorithm. In step 3 above, $$\operatorname*{argmin}_{F} Q(F, \lambda^*)$$

means that a value of F is found that minimizes $Q(F,\lambda^*)$ according to Eq. 3, using the graph-based learning algorithm.

One way of constructing a click graph is to simply form a relatively large click graph based on collected click data. In some scenarios, this may be inefficient. A more efficient manner of constructing a click graph is to start by building a compact click graph and then iteratively expanding the click graph until the click graph reaches a target size.

To build a compact click graph, a technique according to some embodiments removes navigational queries and clusters related URLs. A query is considered navigational when the user is primarily interested in visiting a specific web page in mind. For example, "youtube" is likely to be a navigational query that refers to the URL "www.youtube.com." Such a query usually has a skewed click count (relatively large click count) on one URL and the class membership of that URL can be excessively influenced by this single query. To avoid their adverse effect on the learning algorithms discussed above, navigational queries can be identified and removed from click graphs.

Moreover, related URLs can be clustered into a merged URL to compensate for sparsity of a click graph. Specifically, if a set of URLs have exactly the same top-, second-, and third-level domain names, such URLs can be grouped into a single node and their click counts can be summed accordingly. For example, the individual URLs nursejobs.123usajobs.com, finance.jobs.123usajobs.com, miami.jobs123usajobs.com can be grouped to a cluster URL referred to as "jobs.123usajobs.com."

Finally, since the most reliable information of query classes resides in seed queries, it would be more efficient to apply the learning algorithms discussed above only to a relatively compact click graph that covers these queries. To this end, construction of the click graphs starts from the seed queries and the click graph is iteratively expanded in the following fashion,
1. Initialize a query set $X' = X_L$ (seed query set), and initialize a URL set $Z' = \emptyset$ (in other words, the URL set is initially empty);
2. Update Z' to be the set of URLs that are connected with X' (in other words, add URL nodes that are connected to the query nodes that are present in the click graph);
3. Update X' to be the set of queries that are connected with Z' (in other words, add query nodes to the click graph that are connected to the existing URL nodes in the click graph);
4. Iterate 2 and 3 until X' reaches a target size.

In each iteration, queries and/or URLs with edges having weights less than a threshold can be removed (pruned). The final click graph to which the learning algorithms are applied include X', Z', and the edges connected between them.

Figure 4:
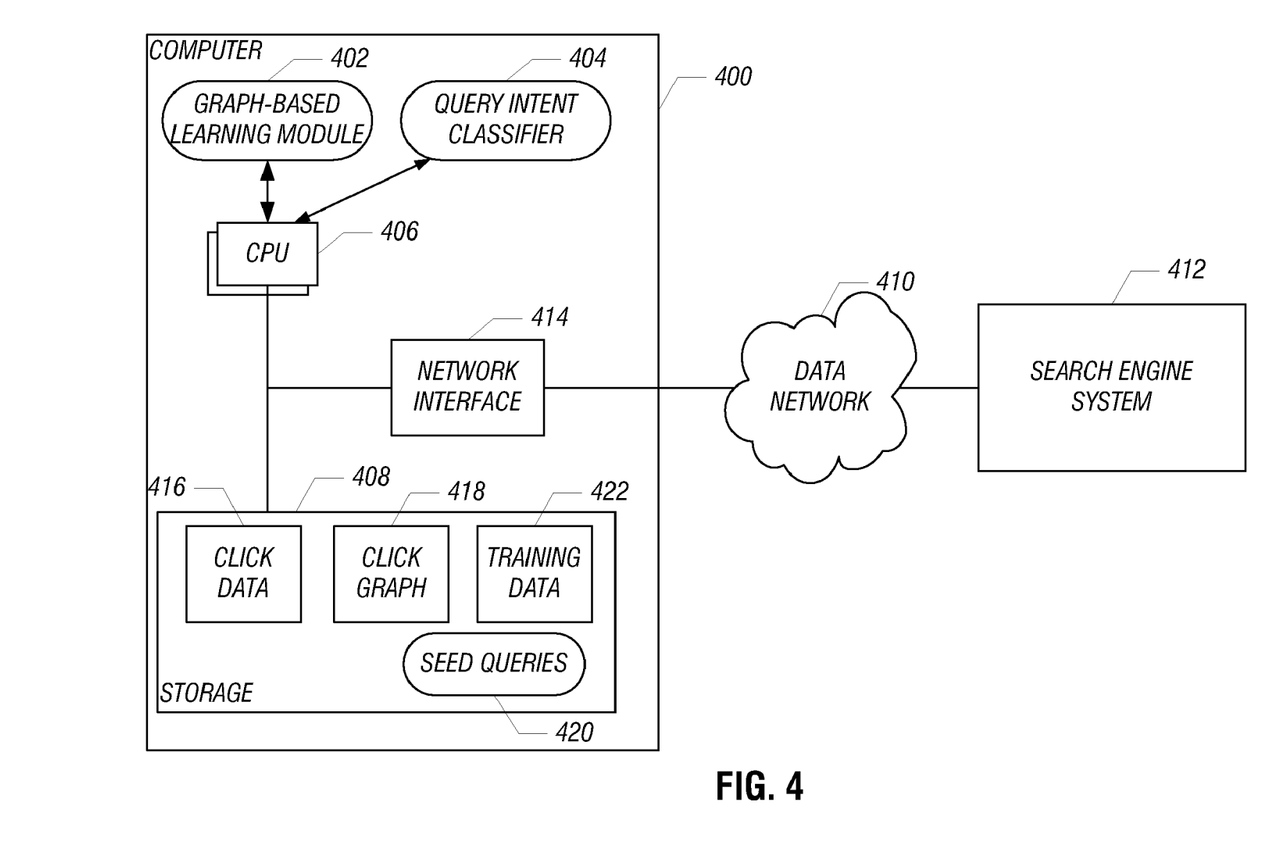
FIG. 4 is a block diagram of an exemplary computer in which an embodiment of the invention can be incorporated.

FIG. 4 illustrates an exemplary computer 400 in which a graph-based learning module 402 and a query intent classifier 404 are executable on one or more central processing units (CPUs) 406. The graph-based learning module 402 applies the graph-based learning algorithm described above, and the query intent classifier 404 is the classifier that is constructed based on training data developed by the graph-based learning module 402.

Note that in the FIG. 2 procedure discussed above, the query intent classifier 404 is merely an output that can be either stored in a storage 408, or communicated over a data network 410 (through a network interface 414) to a search engine system 410 for use with the search engine system 412. However, with the FIG. 3 procedure described above, the graph-based learning module 402 and query intent classifier 404 are used jointly to develop the trained query intent classifier 404.

The storage 408 also includes click data 416, which may have been collected based on monitoring the search engine system 412 (and possibly other search engines). From the click data 416, a click graph 418 is developed. The storage 408 also stores seed queries 420 that are provided to the graph-based learning module 402 along with the click graph 418 for labeling unlabeled queries in the click graph 418 to produce training data 422. The training data 422 is used for training the query intent classifier 404.

Instructions of software described above (including graph-based learning module 402 and query intent classifier 404) are loaded for execution on a processor (such as one or more CPUs 406). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The technique described herein is operational within numerous types of general purpose or special purpose computing devices. Such computing devices can be typically found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc. The device should have a sufficient computational capability and system memory to enable basic computational operations. In particular, the computational capability can include one or more processing unit(s), and may also include one or more GPUs, either or both in communication with system memory. Note that that the processing unit(s) of the general computing device of may be specialized microprocessors, such as a DSP, a VLIW, or other micro-controller, or can be conventional CPUs having one or more processing cores, including specialized GPU-based cores in a multi-core CPU.

In addition, the computing device may also include other components, such as, for example, a communications interface. The computing device may also include one or more conventional computer input devices (e.g., pointing devices, keyboards, audio input devices, video input devices, haptic input devices, devices for receiving wired or wireless data transmissions, etc.). The computing device may also include other optional components, such as, for example, one or more conventional computer output devices (e.g., display device(s), audio output devices, video output devices, devices for transmitting wired or wireless data transmissions, etc.). Note that typical communications interfaces, input devices, output devices, and storage devices for general-purpose computers are well known to those skilled in the art, and will not be described in detail herein.

The computing device may also include a variety of computer readable media. Computer readable media can be any available media that can be accessed by computer via storage devices and includes both volatile and nonvolatile media that is either removable and/or non-removable, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Further, software, programs, and/or computer program products embodying the some or all of the various embodiments of the claimed invention described herein, or portions thereof, may be stored, received, transmitted, or read from any desired combination of computer or machine readable media or storage devices and communication media in the form of computer executable instructions or other data structures.

Finally, the technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:
1. A method of constructing a classifier, comprising:
receiving a click graph correlating queries to items identified by the queries, wherein the click graph contains initial labeled queries that have been labeled with respect to predetermined query-intent classes that represent whether or not corresponding queries are associated with particular intents of users to search for particular information from particular categories of information that a user wishes to perform a search in, and unlabeled queries that have not been labeled with respect to the predetermined query-intent classes, wherein the click graph comprises query nodes representing respective queries that are assigned a positive query-intent class when a query node corresponds to a positive query-intent class, or a negative query intent class when the query node does not correspond to a query-intent class, uniform resource locator (URL) nodes representing respective URLs, and edges between at least some of the query nodes and URL nodes when a user has navigated to a URL node for a given query;
using the click graph to label at least some of the unlabeled queries with respect to the predetermined query-intent classes by inferring the query-intent classes of the unlabeled nodes from class memberships of the labeled query nodes based on similarity of click patterns from query nodes to correlated URL nodes; and using queries in the click graph that have been labeled with respect to the predetermined query-intent classes as training data to train the classifier.

2. The method of claim 1, wherein the classifier comprises a query intent classifier for classifying whether a query is related to a specific query intent, and wherein if a query is related to a specific query intent the query is submitted to a vertical search engine based on that specific intent.

3. The method of claim 1, further comprising assigning weights to respective edges between queries and URLs, wherein the weights are based on counts of clicks from queries to URLs.

4. The method of claim 3, wherein the edges and weights assigned to the respective edges together define the click patterns.

5. The method of claim 1, wherein using the click graph to label at least some of the unlabeled queries comprises:
iteratively computing values of elements in a collection, wherein the values are representative of likelihoods that the queries in the click graph belong to corresponding predetermined classes, wherein iteratively computing the values of elements comprises repeating computation of the values until a convergence criterion has been reached.

6. The method of claim 5, wherein computing values of the elements in the collection is based on an objective function that balances computing the values based on patterns of correlations between the queries and items in the click graph and computing the values based on the initial labeled queries.

7. The method of claim 1, further comprising:
feeding back an output of the classifier to the step of using the click graph to label at least some of the unlabeled queries with respect to the predetermined classes, wherein feeding back the output of the classifier causes re-labeling of some of previously labeled queries; and
modifying the classifier based on the re-labeled queries.

8. The method of claim 1, wherein at least one of the URL nodes represents a group of related URLs.

9. The method of claim 1, wherein the click graph is automatically built by:
initializing the click graph to initially contain query nodes corresponding to the initial labeled queries but that initially does not contain other query nodes;
adding URL nodes connected to the query nodes present in the click graph;
adding query nodes that are connected to the added URL nodes; and
repeating the adding of the URL nodes and adding of the additional query nodes until at least a predefined number of query nodes has been reached.

10. An article comprising:
at least one computer storage device containing instructions that when executed cause a computer to:
receive an initial set of queries that have been labeled with respect to query intent classes;
receive a collection of data in the form of a click graph that includes correlations between unlabeled queries and items identified by the queries, wherein the click graph has query nodes representing respective queries that are assigned a positive query-intent class that represents that corresponding queries are associated with particular intents of users to search for particular information from particular categories of information that a user wishes to perform a search in when a query node corresponds to a positive query-intent class, or a negative query-intent class when the query node does not correspond to a query-intent class, uniform resource locator (URL) nodes representing respective URLs, and edges between at least some of the query nodes and URL nodes when a user has navigated to a URL node for a given query and wherein the respective edges between queries and URLs have weights assigned to them based on counts of clicks from queries to URLs which are used to define click patterns;
apply a graph-based learning algorithm to enable labeling of at least some of the unlabeled queries with respect to the query intent classes according to labeling in the initial set of queries by inferring the query-intent classes of the unlabeled nodes from class memberships of the labeled query nodes based on similarity of click patterns from query nodes to corresponding URL nodes; and
create training data based on the initial set of labeled queries and the queries labeled by the graph-based learning algorithm to train a query intent classifier.

11. The article of claim 10, wherein applying the graph-based learning algorithm comprises:
generating a click graph in response to the received collection of data;
computing values of elements of a collection to represent likelihoods that the queries in the click graph correspond to the query intent classes.

12. The article of claim 10, wherein the instructions when executed cause the computer to further:
use the trained query intent classifier to apply content-based classification on the queries that have been labeled based on the graph-based learning algorithm;
feed back an output of the content-based classification to the graph-based learning algorithm;
re-apply the graph-based learning algorithm using the output of the content-based classification to cause modification in labeling of some of the queries; and
modify the training data based on the re-applying of the graph-based learning algorithm to cause re-training of the query intent classifier.

13. The article of claim 10, wherein the click graph includes edges representing clicks between the unlabeled queries and uniform resource locators (URLs).

14. The article of claim 10, wherein the instructions when executed cause the computer to further send the query intent classifier to a location for use with a search engine.

15. The article of claim 14, wherein the query intent classifier comprises a classifier to classify a query as a query for information from a particular domain.

16. The article of claim 10, wherein receiving the initial set of queries that have been labeled with respect to query intent classes comprises receiving the initial set of queries that have been labeled with respect to query intent classes by one or more humans.

17. A system for constructing a classifier, comprising:
a general purpose computing device;
a computer program comprising program modules executable by the general purpose computing device, wherein the computing device is directed by the program modules of the computer program to,
receive a click graph that contains query nodes representing respective queries and second nodes representing items identified by the queries, wherein a subset of the query nodes have been initially labeled with respect to predetermined query-intent classes that represent whether or not corresponding queries are associated with particular intents of users to search for particular information from particular categories of information that a user wishes to perform a search in and that are assigned a positive query-intent class when a query node corresponds to a positive query-intent class, or a negative query intent class when the query node does not correspond to a query-intent class, and wherein a remainder of the query nodes initially are not labeled with respect to the predetermined query-intent classes;

compute values representing likelihoods that the queries belong to the predetermined query-intent classes by inferring the query-intent classes of the unlabeled nodes from class memberships of the labeled query nodes based on similarity of user click patterns from query nodes to corresponding URL nodes;

assign labels to at least some of the unlabeled query nodes to label the unlabeled query nodes with respect to the predetermined query-intent classes based on the computed values; and use the subset of the query nodes and the query nodes labeled based on the computed values as training data to train a classifier.

18. The system of claim 17, wherein the respective edges between queries and URLs have weights assigned to them based on counts of clicks from queries to URLs and wherein the edges and weights assigned to the respective edges together define the click patterns.

* * * * *